United States Patent
Mayle

(10) Patent No.: US 10,321,143 B1
(45) Date of Patent: Jun. 11, 2019

(54) SYSTEMS AND METHODS FOR INCREASING RESOLUTION OF VIDEO DATA

(71) Applicant: Facebook, Inc., Menlo Park, CA (US)

(72) Inventor: Douglas Michael Mayle, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/856,562

(22) Filed: Dec. 28, 2017

(51) Int. Cl.
*H04N 19/37* (2014.01)
*H04N 19/112* (2014.01)
*H04L 29/06* (2006.01)

(52) U.S. Cl.
CPC ....... *H04N 19/37* (2014.11); *H04L 29/06489* (2013.01); *H04N 19/112* (2014.11)

(58) Field of Classification Search
CPC . H04N 19/37; H04N 19/112; H04L 29/06489
USPC .................................................. 375/240.02
See application file for complete search history.

(56) References Cited

U.S. PATENT DOCUMENTS

| 2011/0211036 A1* | 9/2011 | Tran | H04N 5/23238 348/14.08 |
| 2017/0085790 A1* | 3/2017 | Bohn | H04N 5/23235 |
| 2017/0236252 A1* | 8/2017 | Nguyen | H04N 13/383 345/419 |

* cited by examiner

*Primary Examiner* — Dominic D Saltarelli
(74) *Attorney, Agent, or Firm* — Sheppard Mullin Richter & Hampton LLP

(57) ABSTRACT

Systems, methods, and non-transitory computer readable media can obtain a first plurality of frames of a video having a first resolution. For each frame of the first plurality of frames, a portion of a corresponding frame of a version of the video having a second resolution that is higher than the first resolution can be sampled to generate a bias for the frame. A second plurality of frames of the video including the respective bias can be generated, wherein the second plurality of frames corresponds to the first plurality of frames. A second plurality of frames of the video including the respective bias can be generated.

20 Claims, 10 Drawing Sheets

SYSTEMS AND METHODS FOR INCREASING RESOLUTION OF VIDEO DATA

FIELD OF THE INVENTION

The present technology relates to image and video generation. More particularly, the present technology relates to techniques for increasing resolution of video data in computer networking.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user to access.

SUMMARY

Various embodiments of the present disclosure can include systems, methods, and non-transitory computer readable media configured to obtain a first plurality of frames of a video having a first resolution. For each frame of the first plurality of frames, a portion of a corresponding frame of a version of the video having a second resolution that is higher than the first resolution can be sampled to generate a bias for the frame. A second plurality of frames of the video including the respective bias can be generated, wherein the second plurality of frames corresponds to the first plurality of frames. A second plurality of frames of the video including the respective bias can be generated.

In some embodiments, each frame of the first plurality of frames and each frame of the second plurality of frames is an I-frame.

In certain embodiments, the bias is selected from one or more of: a scanning bias, a pseudo random bias, a random bias, or a stippled bias.

In an embodiment, the bias is a pseudo random bias, wherein the bias series includes an initial value to be input into a pseudo random number generator, and wherein the location of the bias in each frame of the second plurality of frames is indicated by a corresponding number generated by the pseudo random number generator.

In some embodiments, the second plurality of frames and the bias series can be transmitted to a decoder.

In certain embodiments, a set of weights associated with each frame of the second plurality of frames is determined, and the second plurality of frames is combined based on the associated sets of weights to generate a combined frame that provides image data at a higher resolution than the first resolution.

In an embodiment, one or more frames of the video are reconstructed by the decoder based on the combined frame.

In some embodiments, the set of weights associated with each frame of the second plurality of frames includes a weight for each pixel of the frame.

In certain embodiments, a pixel including the bias in a frame of the second plurality of frames is assigned a higher weight than a pixel not including the bias in the frame.

In an embodiment, the second plurality of frames depicts the same scene or scenes having a similarity metric that satisfies that a threshold value.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
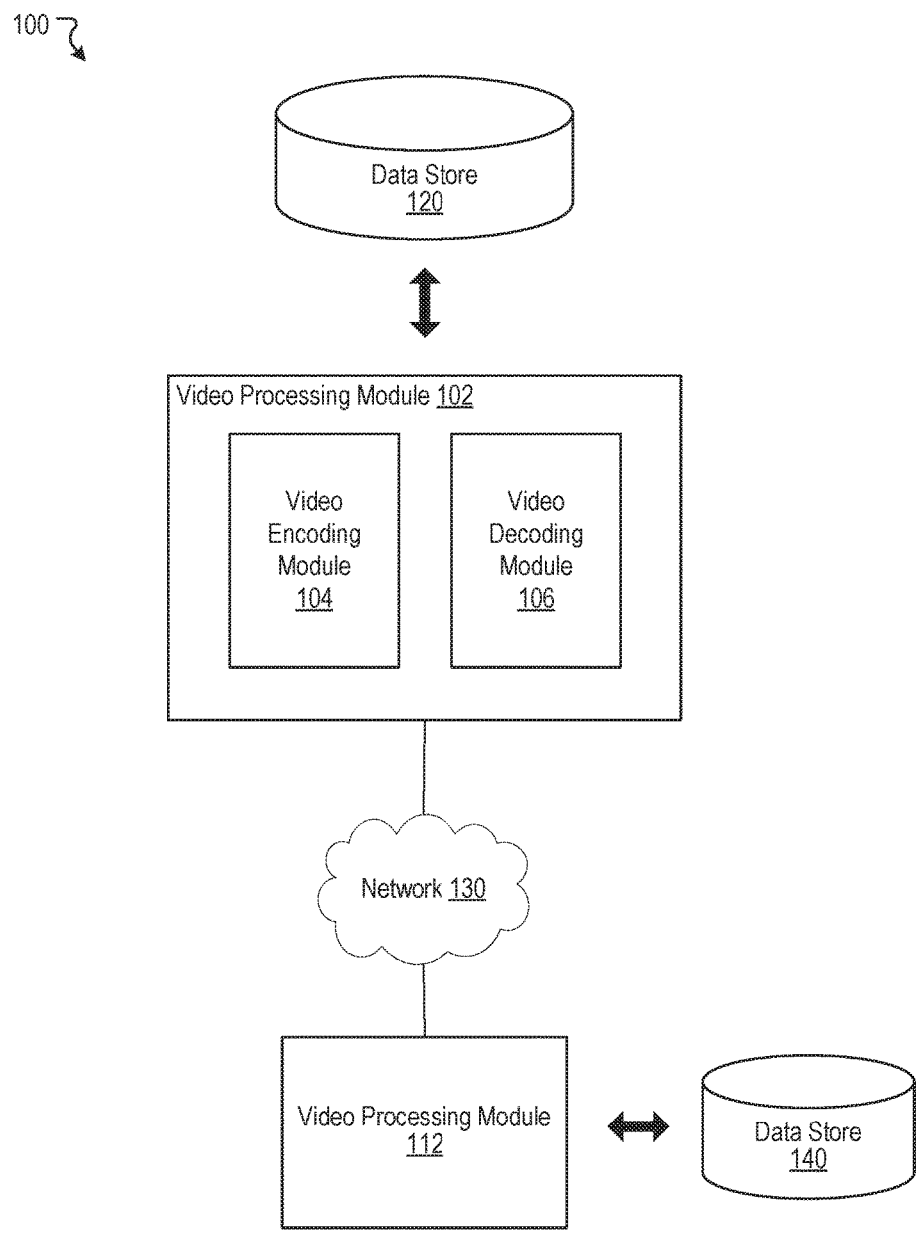
FIG. 1 illustrates an example system including an example video processing module configured to process video data, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Systems and Methods for Increasing Resolution of Video Data

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access.

A social networking system can provide media content items, such as images or videos, created by users. For example, users may record and upload videos to a server associated with the social networking system. The videos uploaded to the server in turn can be downloaded by or transmitted to other users of the social networking system. Under conventional approaches specifically arising in the realm of computer technology, a video is often transmitted at a lower resolution than a resolution in which the video is captured. For example, a video may be recorded at a high resolution, but transmitted at a lower resolution due to bandwidth limitations. Accordingly, high resolution video data may not be utilized when transmitting a video.

An improved approach rooted in computer technology can overcome the foregoing and other disadvantages associated with conventional approaches specifically arising in the realm of computer technology. Based on computer technology, the disclosed technology can introduce a bias into video data and increase resolution of a video. A video may be captured at a high resolution by a camera or a video camera. A low resolution version of the video can be created, and the low resolution version of the video instead of the high resolution version may be transmitted over a network. The disclosed technology can sample different portions of a frame of a high resolution version ("high resolution frame") of a video over time in order to introduce a bias in a corresponding frame of a low resolution version ("low resolution frame") of the video. A bias can provide high resolution image data for a particular portion of a frame of a video. For instance, for a low resolution frame of the video that is an intra-coded frame ("I-frame"), a portion of a corresponding high resolution frame of the video can be sampled and included in the low resolution frame of the video. An encoder can transmit the low resolution frame of the video including a bias. The encoder can also transmit a bias series that indicates the location of the bias in a low resolution frame over time. A decoder can receive the low resolution frame of the video including the bias and determine a set of weights for pixels of the low resolution frame. The decoder can receive the bias series and determine a set of weights for a particular low resolution frame based on the location of the bias in the particular low resolution frame. A portion of a low resolution frame of the video including a bias can be weighted higher than the rest of the low resolution frame. Low resolution frames including a bias can be combined based on a respective set of weights in order to generate an I-frame that is at a higher resolution than the resolution of the low resolution frames. Other frames can be reconstructed based on the generated I-frame in order to provide video data that is at a higher resolution than the resolution of the low resolution frames. In this manner, high resolution image data can be generated from a low resolution version of a video over time. Additional details relating to the disclosed technology are provided below.

FIG. 1 illustrates an example system 100 including an example video processing module 102 configured to process video data, according to an embodiment of the present disclosure. The video processing module 102 can include a video encoding module 104 and a video decoding module 106. In some instances, the video processing module 102 can be coupled to a data store 120. The video processing module 102 can communicate with a video processing module 112, for example, over a network 130. The video processing module 112 can be the same as or similar to the video processing module 102. For example, the video processing module 112 can also include a video encoding module and a video decoding module. In some instances, the video processing module 112 can be coupled to a data store 140, which can be the same as or similar to the data store 120.

In some embodiments, the video processing module 102 can encode video data and transmit the encoded video data to another video processing module, such as the video processing module 112. In these embodiments, the video processing module 102 can act as an encoder, and the other video processing module, such as the video processing module 112, can act as a decoder. In such embodiments, the video processing module 102 can be considered to be a server, and the other video processing module, such as the video processing module 112, can be considered to be a client. In other embodiments, the video processing module 102 receive video data from another video processing module, such as the video processing module 112, and decode the received video data. In these embodiments, the other video processing module, such as the video processing module 112, can act as an encoder, and the video processing module 102 can act as a decoder. In such embodiments, the other video processing module, such as the video processing module 112, can be considered to be a server, and the video processing module 102 can be considered to be a client.

The video processing module 102 and the video processing module 112 of the present disclosure can be utilized in various applications and environments including but not limited to video conferencing systems. For example, with respect to video conferencing systems, multiple conference locations can each have dedicated video processing equipment. Video processing equipment at a conference location can include an encoder and/or a decoder. For example, video processing equipment at a conference location can include the video processing module 102. For example, an encoder at a conference location can include the video encoding module 104, and a decoder at a conference location can include the video decoding module 106. During a video conference, a video of a conference location can be captured at a high resolution. As discussed herein, a video captured at a high resolution can be referred to as a "high resolution video." A high resolution video is often transmitted over a network to another conference location at a lower resolution than the high resolution, for example, due to bandwidth constraints. For example, a low resolution version of the high resolution video can be created for transmission. A low resolution version of the video that is transmitted over a network can be referred as a "low resolution video." For example, a high resolution video can be compressed for transmitting over a network. The video processing module 102 can include a bias that is sampled from the high resolution video in the lower resolution video in order to improve effective resolution of the low resolution video, as described further below.

Each video can include one or more frames. A frame in a high resolution video can be referred to as a "high resolution frame." A frame in a low resolution video can be referred to as a "low resolution frame." Frames in a video can include, for example, intra-coded frames ("I-frames"), predicted frames ("P-frames"), and bidirectional predicted frames ("B-frames"). An I-frame can refer to a frame that does not require other frames for decoding. I-frames may be retransmitted periodically, for example, for error recovery. A high resolution frame that is an I-frame can be referred to as a "high resolution I-frame." A low resolution frame that is an I-frame can be referred to as a "low resolution I-frame." A P-frame can refer to a frame that indicates changes from a previous frame. A B-frame can refer to a frame that indicates changes from both a previous frame and a subsequent frame.

The video processing module 102 can introduce a bias into a low resolution I-frame in order to provide high resolution pixel data for a portion of the low resolution I-frame. A bias can include pixel data sampled from a particular portion of a high resolution frame that corresponds to a low resolution I-frame. The sampled pixel data from the particular portion of the high resolution frame can provide high resolution pixel data for a portion of the low resolution I-frame that corresponds to the particular portion of the high resolution frame. In some embodiments, a high resolution frame may be an I-frame. As discussed herein, a location of a bias can refer to a portion of a low resolution I-frame that corresponds to a particular portion of a corresponding high resolution frame from which high resolution pixel data for a bias in the low resolution I-frame is sampled. The location of a bias in low resolution I-frames can be selected to vary across low resolution I-frames. For instance, if the location of a bias varies across low resolution I-frames, high resolution pixel data can be provided for different portions of low resolution I-frames over time. Multiple low resolution I-frames that depict the same scene or similar scenes can be combined in order to generate a combined I-frame, which can have a higher resolution than the resolution of each of the low resolution I-frames. The combined I-frame can then be used to generate an image of the scene that is higher resolution than the resolution of the low resolution I-frames. A combined I-frame generated from multiple low resolution I-frames can be referred to as a "high resolution combined I-frame."

In some cases, content of a video that is transmitted over a network may not change significantly over time. For example, during a video conference, most participants remain in the same location and do not move substantially. Therefore, a scene depicted in low resolution I-frames may not change significantly over time. Accordingly, the disclosed technology can use multiple low resolution I-frames to introduce high resolution image data for a scene over time by including a bias for different portions of the low resolution I-frames. In this way, the disclosed technology can leverage high resolution image data in a low resolution video and thereby improve effective resolution of the low resolution video. Since high resolution image data from high resolution frames is at a resolution that is higher than the resolution of low resolution I-frames, the high resolution image data can provide subpixel image data for the low resolution I-frames. Accordingly, high resolution image data from high resolution frames can also be referred to as subpixel image data.

The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the video processing module 102 can be implemented in any suitable combinations. While the disclosed technology is described in connection with video conferencing systems for illustrative purposes, the disclosed technology can apply to any other type of system and/or content.

The video encoding module 104 can encode and transmit video data including a bias over time. The video encoding module 104 can generate a bias over time associated with video data. A type of bias for low resolution I-frames can be determined, and low resolution I-frames including a bias can be generated. The video encoding module 104 can also encode and transmit a bias series that indicates the location of a bias in low resolution I-frames over time. Functionality of the video encoding module 104 is described in more detail herein.

The video decoding module 106 can receive and decode video data including a bias over time. The video decoding module 106 can also receive and decode a bias series that indicates the location of a bias in low resolution I-frames over time. High resolution frames can be generated from low resolution I-frames including a bias over time. For example, a bias included in low resolution I-frames can be determined, and a high resolution combined I-frame can be generated based on the low resolution I-frames. Functionality of the video decoding module 106 is described in more detail herein.

In some embodiments, the video processing module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video processing module 102 can be, in part or in whole, implemented as software running on one or more computing devices or systems, such as on a server system or a client computing device. In some instances, the video processing module 102 can be, in part or in whole, implemented within or configured to operate in conjunction or be integrated with a social networking system (or service), such as a social networking system 630 of FIG. 6. Likewise, in some instances, the video processing module 102 can be, in part or in whole, implemented within or configured to operate in conjunction or be integrated with a client computing device, such as the user device 610 of FIG. 6. For example, the video processing module 102 can be implemented as or within a dedicated application (e.g., app), a program, or an applet running on a user computing device or client computing system. The application incorporating or implementing instructions for performing functionality of the video processing module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The data store 120 can be configured to store and maintain various types of data, such as the data relating to support and operation of the video processing module 102. The data maintained by the data store 120 can include, for example, information relating to video data, high resolution videos, low resolution videos, frames, a bias, bias series, weights for pixels, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the video processing module 102 can be configured to communicate and/or operate with the data store 120. In some embodiments, the data store 120 can be a data store of a server system in communication with a client computing device. In some embodiments, the data store 120 can be a data store within a client computing device. The video processing module 112 can be configured to communicate and/or operate with the data store 140, which can be similar to the data store 120.

Figure 2A:
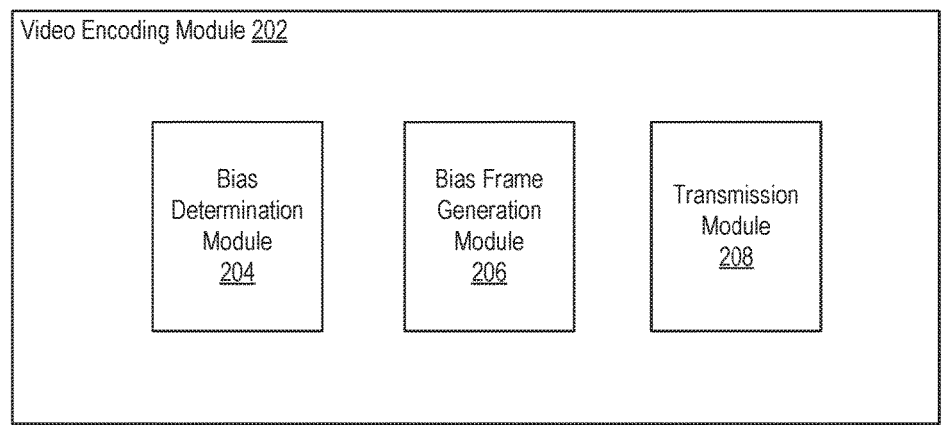
FIG. 2A illustrates an example video encoding module configured to encode video data including a bias over time, according to an embodiment of the present disclosure.

FIG. 2A illustrates an example video encoding module 202 configured to encode video data including a bias over time, according to an embodiment of the present disclosure. In some embodiments, the video encoding module 104 of FIG. 1 can be implemented with the example video encoding module 202. As shown in the example of FIG. 2A, the example video encoding module 202 can include a bias determination module 204, a bias frame generation module 206, and a transmission module 208.

The bias determination module 204 can determine a type of bias to introduce in low resolution I-frames. Examples of types of bias can include a scanning bias, a pseudo random bias, a random bias, etc. A scanning bias can indicate a bias that reflects a sequential sampling from frames over time, for example, by scanning horizontally or vertically. For example, for a scanning bias, the bias determination module 204 can sample, for a first low resolution I-frame, a first pixel from a first row of a corresponding high resolution frame, sample, for a second low resolution I-frame, a second pixel from a first row of a corresponding high resolution frame, and so forth. When the end of a row of a high resolution frame is reached, the bias determination module 204 can scan the next row of a high resolution frame in order to sample a pixel. In this way, the location of a portion sampled by a scanning bias can move sequentially in low resolution I-frames over time. A pseudo random bias can indicate a bias that reflects a sampling from frames based on numbers generated by a pseudo random number generator over time. For example, for a pseudo random bias, the bias determination module 204 can sample, for a first low resolution I-frame, a pixel from a corresponding high resolution frame at a location corresponding to or otherwise indicated by a first number generated by a pseudo random number generator, sample, for a second low resolution I-frame, a pixel from a corresponding high resolution frame at a location corresponding to or otherwise indicated by a second number generated by the pseudo random number generator, and so forth. A random bias can indicate a bias that reflects a random sampling from frames over time. For example, for a random bias, the bias determination module 204 can sample, for a first low resolution I-frame, a pixel from a corresponding high resolution frame at a location corresponding to or otherwise indicated by a first random number, sample, for a second low resolution I-frame, a pixel from a corresponding high resolution frame at a location corresponding to or otherwise indicated by a second random number, etc. In some embodiments, the bias determination module 204 can sample multiple pixels rather than one pixel. In certain embodiments, the bias determination module 204 can determine a bias such that a location that is likely to depict a subject matter of interest is sampled from high resolution frames over time. For example, a bias can be determined based on an S-curve, a Hilbert curve, etc. In this way, a bias can be determined in a distributed fashion across candidate locations. In some cases, a bias determined in this manner may be referred to as a "stippled bias." Many variations are possible.

The bias frame generation module 206 can generate low resolution I-frames including bias. A type of the bias can be determined by the bias determination module 204. The bias frame generation module 206 can introduce a bias for each low resolution I-frame based on the type of bias. For example, if the type of bias is pseudo random, a portion of a high resolution frame corresponding to each low resolution I-frame can be sampled based on a particular number generated by a pseudo random number generator for that low resolution I-frame. For example, a portion of a high resolution frame that is sampled can replace a corresponding portion in a corresponding low resolution I-frame in order to generate a low resolution I-frame that includes a bias. In some embodiments, an encoder can include a primary encoder and a secondary encoder, and a low resolution I-frame including a bias can be generated by the secondary encoder. A low resolution I-frame that includes a bias can be encoded and transmitted to a decoder, for example, by the transmission module 208. A frame that includes a bias can be referred to as a "bias frame." For example, a low resolution I-frame including a bias can be referred to as a "low resolution bias I-frame."

The bias frame generation module 206 can also generate a bias series that indicates the location of a bias for each low resolution bias I-frame. As an example, the bias series can indicate a timestamp associated with a low resolution bias I-frame and information relating to the location of a bias in the low resolution bias I-frame. For a pseudo random bias, locations of a bias in different low resolution bias I-frames can be sent as a single number indicating an initial value to be input into a pseudo random number generator. For example, an encoder and a decoder can use the same pseudo random number generator, and the initial value can be input into the pseudo random number generator at the decoder in order to recreate the locations of a bias in different low resolution bias I-frames. For example, each number generated by the pseudo random number generator can indicate the location of a bias in a corresponding low resolution bias I-frame. In some embodiments, an encoder can include a primary encoder and a secondary encoder, and a bias series can be generated by the secondary encoder. A bias series can be encoded and transmitted to a decoder, for example, by the transmission module 208.

The transmission module 208 can transmit video data. For example, the transmission module 208 can encode video data including one or more frames. The transmission module 208 can transmit the encoded video data to one or more decoders. For example, the transmission module 208 can encode and transmit low resolution bias I-frames as well as a bias series that indicates the location of a bias in the low resolution I-frames over time. All examples herein are provided for illustrative purposes, and there can be many variations and other possibilities.

Figure 2B:
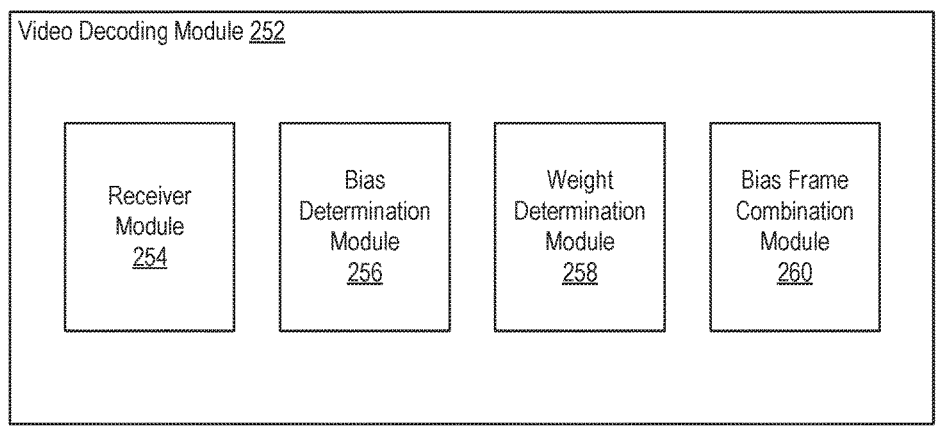
FIG. 2B illustrates an example video decoding module configured to decode video data including a bias over time, according to an embodiment of the present disclosure.

FIG. 2B illustrates an example video decoding module 252 configured to decode video data including a bias over time, according to an embodiment of the present disclosure. In some embodiments, the video decoding module 106 of FIG. 1 can be implemented with the example video decoding module 252. As shown in the example of FIG. 2B, the example video decoding module 252 can include a receiver module 254, a bias determination module 256, a weight determination module 258, and a bias frame combination module 260.

The receiver module 254 can receive video data. For example, the receiver module 254 can receive encoded video data from one or more encoders. The receiver module 254 can decode the encoded video data in order to generate one or more frames. For example, the receiver module 254 can receive and decode low resolution bias I-frames as well as a bias series that indicates the location of a bias in the low resolution I-frames over time.

The bias determination module 256 can determine the location of a bias in a low resolution I-frame including a bias. For example, the bias determination module 256 can determine the location of a bias in a low resolution bias I-frame based on a bias series. For example, the bias series can be received from an encoder and decoded, for example, by the receiver module 254. As mentioned above, the bias series may indicate a timestamp associated with a low resolution bias I-frame and information relating to the location of a bias in the low resolution bias I-frame. For a pseudo random bias, a single number indicating an initial value to be input into a pseudo random number generator can be received as the bias series, and the bias determination module 256 can recreate locations of the bias in different low resolution bias I-frames based on numbers generated by the pseudo random number generator. For example, each number generated by the pseudo random number generator can indicate the location of a bias in a corresponding low resolution bias I-frame.

The weight determination module 258 can determine weights associated with low resolution bias I-frames that can be used to combine multiple low resolution bias I-frames. For example, one or more low resolution bias I-frames can depict the same or scene or similar scenes. In some instances, scenes can be considered to be similar if a similarity metric associated with the scenes satisfy a threshold value. Low resolution bias I-frames depicting a scene can be combined to generate a high resolution combined I-frame of the scene. The weight determination module 258 can determine a set of weights associated with each low resolution bias I-frame, and low resolution bias I-frames depicting a scene can be combined based on a respective set of weights, as described below. In certain embodiments, weights associated with low resolution bias I-frames may be determined by the video encoding module 104 and sent to the decoding module 106. In these embodiments, the weight determination module 258 can use the weights associated with low resolution bias I-frames that are received from the video encoding module 104.

The weight determination module 258 can determine weights associated with a low resolution bias I-frames based on a bias included in the low resolution bias I-frame. For example, a portion of a low resolution bias I-frame including a bias can be weighted more highly than a portion of the low resolution bias I-frame not including the bias. The weight determination module 258 can also determine weights associated with a low resolution bias I-frame based on to which portions of a high resolution combined I-frame the low resolution bias I-frame frame maps. When low resolution bias I-frames depicting a scene are combined to generate a high resolution combined I-frame, low resolution bias I-frames may have to be aligned or translated to map to a corresponding portion of the scene in the high resolution combined I-frame. In some instances, a portion of a scene depicted in different low resolution bias I-frames may move slightly over time, and the different low resolution bias I-frames may not be depict the same portion of the scene. In these instances, the low resolution bias I-frames are not aligned. To align the low resolution bias I-frames so that their combination coherently depicts the scene, each low resolution bias I-frame can be translated based on the portion of the scene depicted in the low resolution bias I-frame to map to a corresponding portion of the scene depicted in a high resolution combined I-frame.

In some embodiments, the weight determination module 258 can determine a weight for each pixel of a low resolution bias I-frame. A weight associated with a pixel can indicate importance of a pixel in a first low resolution bias I-frame compared to a pixel in a second low resolution bias I-frame in generating a high resolution combined I-frame. The pixel in the first low resolution bias I-frame and the pixel in the second low resolution bias I-frame may map to the same one or more pixels of a high resolution combined I-frame. For instance, the weight associated with the pixel in the first low resolution bias I-frame and the weight associated with the pixel in the second low resolution bias I-frame can indicate respective importance of the pixels in determining the value of one or more corresponding pixels in the high resolution combined I-frame. In some cases, a weight associated with a pixel can also indicate importance of a first pixel in a low resolution bias I-frame compared to a second pixel in the same low resolution bias I-frame in generating a high resolution combined I-frame. For instance, weights can vary for different pixels within the same low resolution bias I-frame. In some embodiments, there may be multiple sets of weights and/or levels of weights for each low resolution bias I-frame.

The weights for a low resolution bias I-frame can be used in combining low resolution bias I-frames depicting the same scene or similar scenes to generate a high resolution combined I-frame. For example, if low resolution bias I-frames are not aligned, each low resolution bias I-frame can depict a different portion of a scene. As described above, the multiple captured images can be translated and mapped to a corresponding portion of the scene in a high resolution combined I-frame. Weights for each low resolution bias I-frame can be determined based on how the low resolution bias I-frame maps to the high resolution combined I-frame. For instance, a low resolution bias I-frame that aligns with a particular section of the high resolution combined I-frame can be weighted more highly than a low resolution bias I-frame that does not align with that particular section. A low resolution bias I-frame may align with the particular section of the high resolution combined I-frame if a portion of the scene depicted in the low resolution bias I-frame perfectly maps to or aligns with a portion of the scene depicted in the particular section of the high resolution combined I-frame. In addition, a portion of a low resolution bias I-frame where the bias is located can be weighted more highly than the rest of the low resolution bias I-frame. For instance, a portion of a low resolution bias I-frame that provides high resolution image data for a particular section of the high resolution combined I-frame can be weighted more highly than a portion of the low resolution bias I-frame or a portion of another low resolution bias I-frame that does not provide high resolution image data for the particular section of the high resolution combined I-frame. A portion of a low resolution bias I-frame where the bias is located can be weighted more highly than the rest of the low resolution bias I-frame. For example, a portion of a low resolution bias I-frame can be one or more pixels. In some embodiments, the weights can be determined and tuned manually.

In some embodiments, the weight determination module 258 can determine weights associated with a low resolution bias I-frame based on machine learning techniques. For example, the weight determination module 258 can train a machine learning model based on training data including multiple low resolution bias I-frames of scenes, corresponding high resolution combined I-frames of scenes, and/or bias. The trained machine learning model can predict weights for a particular set of low resolution bias I-frames. For example, the trained machine learning model can predict weights for pixels of a low resolution bias I-frame. In some embodiments, the machine learning model can be a neural network. One or more machine learning models discussed in connection with the video processing module 102 and its components can be implemented separately or in combination, for example, as a single machine learning model, as multiple machine learning models, as one or more staged machine learning models, as one or more combined machine learning models, etc.

The bias frame combination module 260 can generate a high resolution combined I-frame based on low resolution bias I-frames and corresponding weights for the low resolution bias I-frames. In an example, each low resolution bias I-frame can have a set of weights associated with the low resolution bias I-frame, and a pairwise join or another operation can be performed on each low resolution bias I-frame and the set of weights. In some embodiments, a type of join and/or other operations performed on low resolution bias I-frames and respective sets of weights can vary depending on the bias. For example, a join and/or other operations performed can be adapted for a particular type of bias. The bias frame combination module 260 can combine the weighted low resolution bias I-frames to generate a high resolution combined I-frame. The bias frame combination module 260 can generate or reconstruct frames of a video that depend on low resolution bias I-frames for decoding based on the high resolution combined I-frame. For example, if a frame of the video depends on a low resolution bias I-frame for prediction, such as a P-frame or a B-frame, the high resolution combined I-frame can be used in place of the low resolution bias I-frame in order to reconstruct the frame. Since the high resolution combined I-frame can provide image data at a higher resolution than the resolution of the low resolution bias I-frames, frames of the video generated using the high resolution combined I-frame can also provide image data at a higher resolution than the resolution of the low resolution bias I-frames. In some embodiments, the resolution of the high resolution combined I-frame can be the same as the resolution of high resolution frames from which the biases for the low resolution bias I-frame are sampled. In other embodiments, the resolution of the high resolution combined I-frame can be lower than the resolution of high resolution frames from which the biases for the low resolution bias I-frame are sampled, but higher than the resolution of the low resolution bias I-frames. All examples herein are provided for illustrative purposes, and there can be many variations and other possibilities.

Figure 3A:
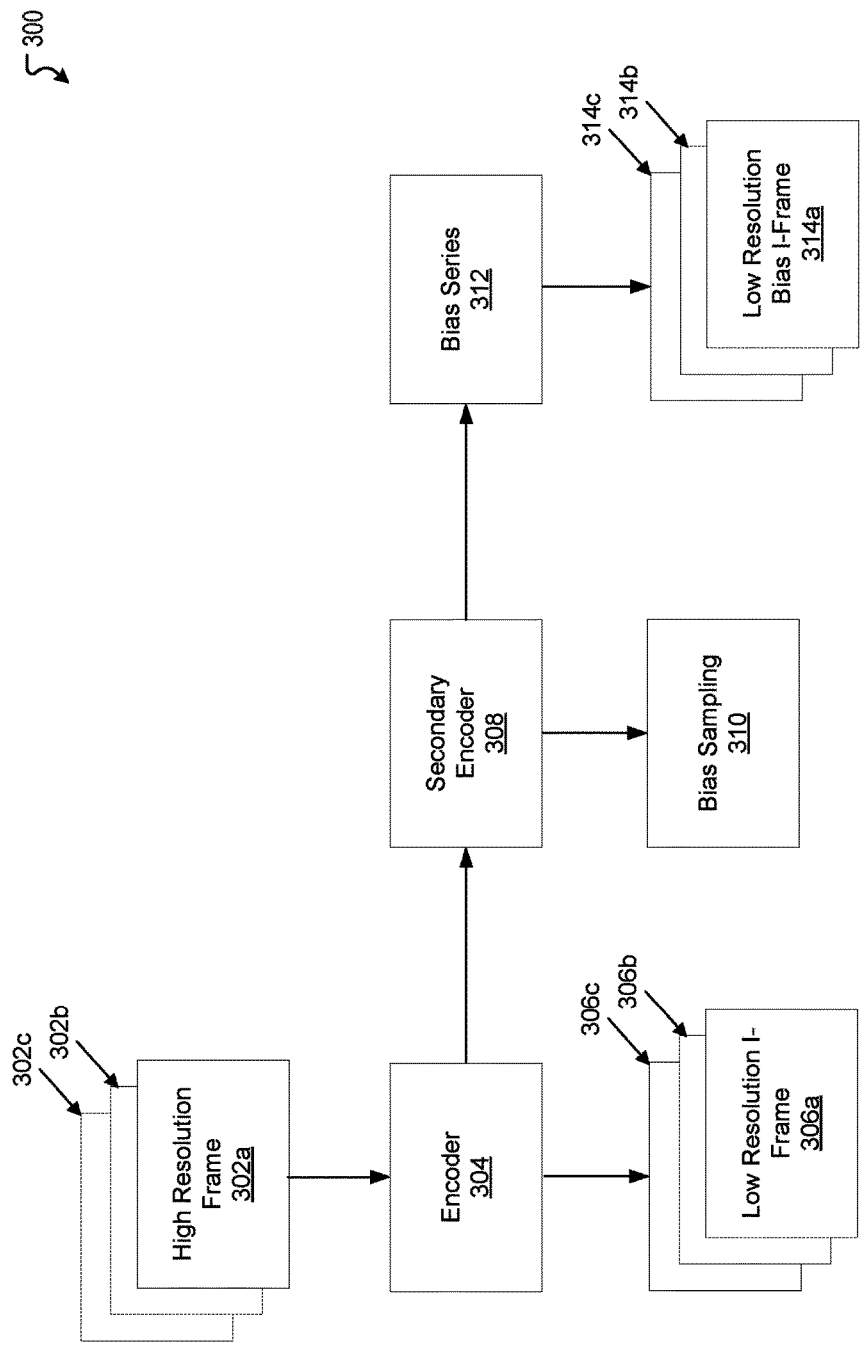
FIG. 3A illustrates a functional block diagram for encoding video data including a bias, according to an embodiment of the present disclosure.

FIG. 3A illustrates a functional block diagram 300 for encoding video data including a bias, according to an embodiment of the present disclosure. Video data can be encoded and transmitted by the video processing module 102, as discussed herein. In particular, an encoder or primary encoder 304 can encode one or more high resolution frames 302a-c of a high resolution video to generate low resolution I-frames 306a-c. For example, the low resolution I-frames 306a-c can depict the same scene or similar scenes. A secondary encoder 308 can determine a bias for the low resolution I-frame 306a, 306b, or 306c. For example, the secondary encoder 308 can perform bias sampling 310 on a portion of a high resolution frame 302a, 302b, or 302c. A resulting bias can be included in the low resolution I-frame 306a, 306b, or 306c. A bias can be determined based on different types of bias, such as a scanning bias, a pseudo random bias, a random bias, etc. The secondary encoder 308 can determine a bias series 312 indicating the location of a bias in a low resolution I-frame 306a, 306b, or 306c. The secondary encoder 308 can generate one or more low resolution bias I-frames 314a-c that each include a corresponding bias. In some embodiments, functionalities performed by the secondary encoder 308 can be performed by the encoder 304. All examples herein are provided for illustrative purposes, and there can be many variations and other possibilities.

Figure 3B:
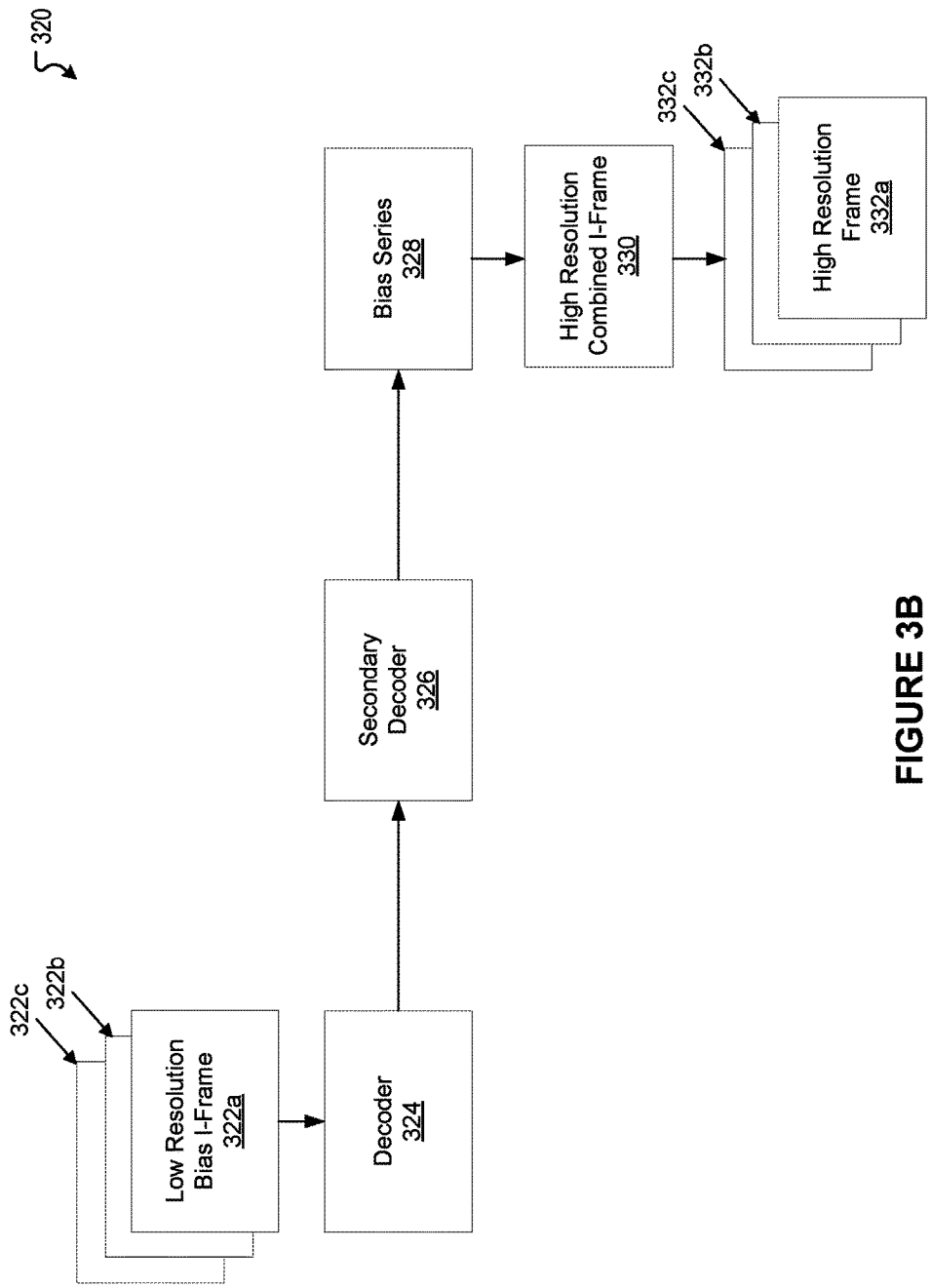
FIG. 3B illustrates a functional block diagram for decoding video data including a bias, according to an embodiment of the present disclosure.

FIG. 3B illustrates a functional block diagram 320 for decoding video data including a bias, according to an embodiment of the present disclosure. Video data can be received and decoded by the video processing module 102, as discussed herein. In particular, a decoder or primary decoder 324 can decode one or more low resolution bias I-frames 322a-c of a low resolution video. For example, the low resolution bias I-frames 322a-c can depict the same scene or similar scenes. A secondary decoder 326 can determine a bias series 328 that indicates the location of a bias in the low resolution bias I-frames 322a-c. The secondary decoder 326 can determine the location of a bias in the low resolution bias I-frames 322a-c based on the bias series 328. The secondary decoder 326 can combine the low resolution bias I-frames 322a-c based on weights associated with the low resolution bias I-frames 322a-c in order to generate a high resolution combined I-frame 330. The secondary decoder 326 can generate high resolution frames 332a-c based on the high resolution combined I-frame 330. In some embodiments, functionalities performed by the secondary decoder 326 can be performed by the decoder 324. All examples herein are provided for illustrative purposes, and there can be many variations and other possibilities.

Figure 3C:
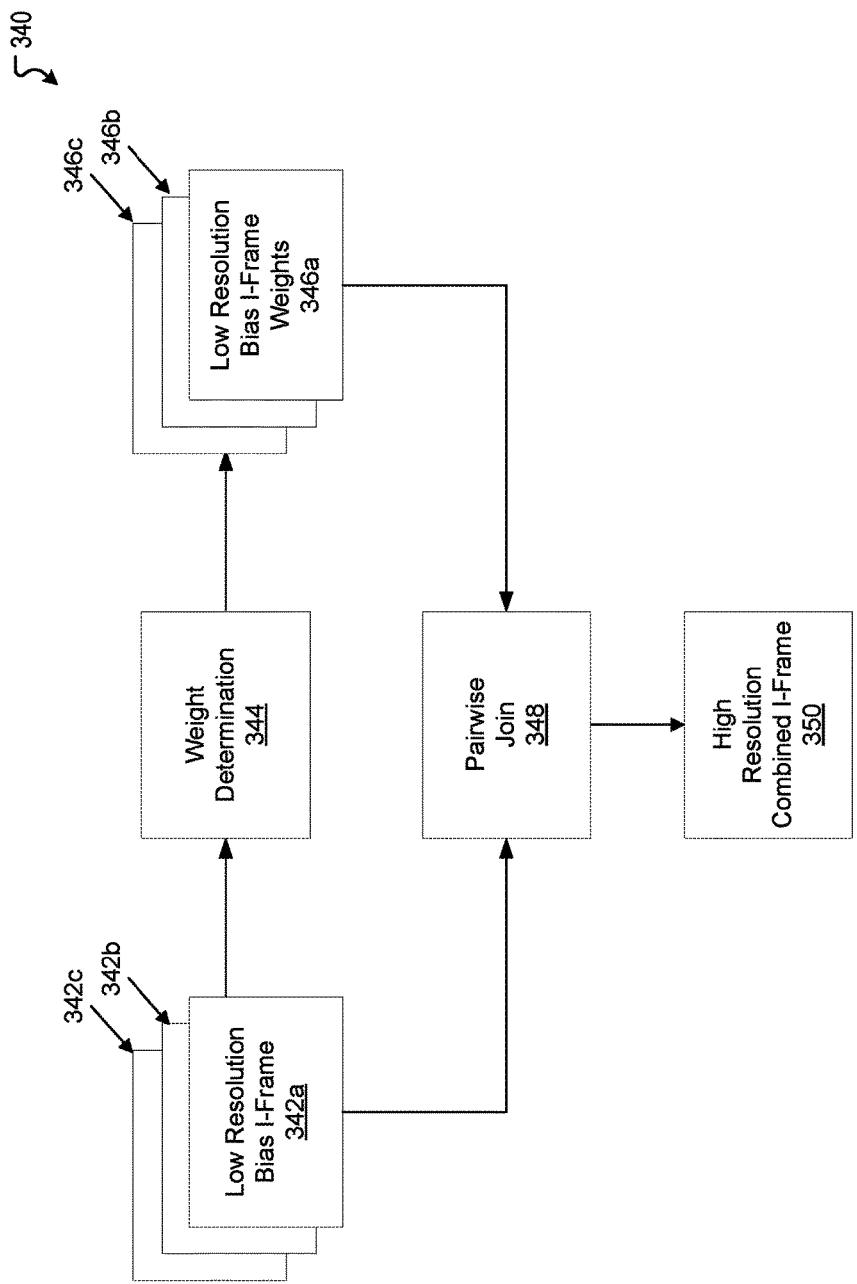
FIG. 3C illustrates a functional block diagram for generating high resolution frames, according to an embodiment of the present disclosure.

FIG. 3C illustrates a functional block diagram 340 for generating high resolution frames, according to an embodiment of the present disclosure. The functional block diagram 340 illustrates combining low resolution bias I-frames 342a-c to generate a high resolution combined I-frame 350. At block 344, weights can be determined for the low resolution bias I-frames 342a-c. For example, weights can be determined as described above in connection with the video processing module 102. Low resolution bias I-frame weights 346a can be a set of weights associated with the low resolution bias I-frame 342a; low resolution bias I-frame weights 346b can be a set of weights associated with the low resolution bias I-frame 342b; and low resolution bias I-frame weights 346c can be a set of weights associated with the low resolution bias I-frame 342c. Weights for a low resolution bias I-frame can include a weight for each pixel of the low resolution bias I-frame. At block 348, an operation to match a low resolution bias I-frame and its associated weights, such as a pairwise join, can be performed on the low resolution bias I-frames 342*a-c* and, respectively, the corresponding weights 346*a-c*. A high resolution combined I-frame 350 can be generated from the low resolution bias I-frames 342*a-c* that have been weighted by the corresponding weights 346*a-c*. All examples herein are provided for illustrative purposes, and there can be many variations and other possibilities.

Figure 4:
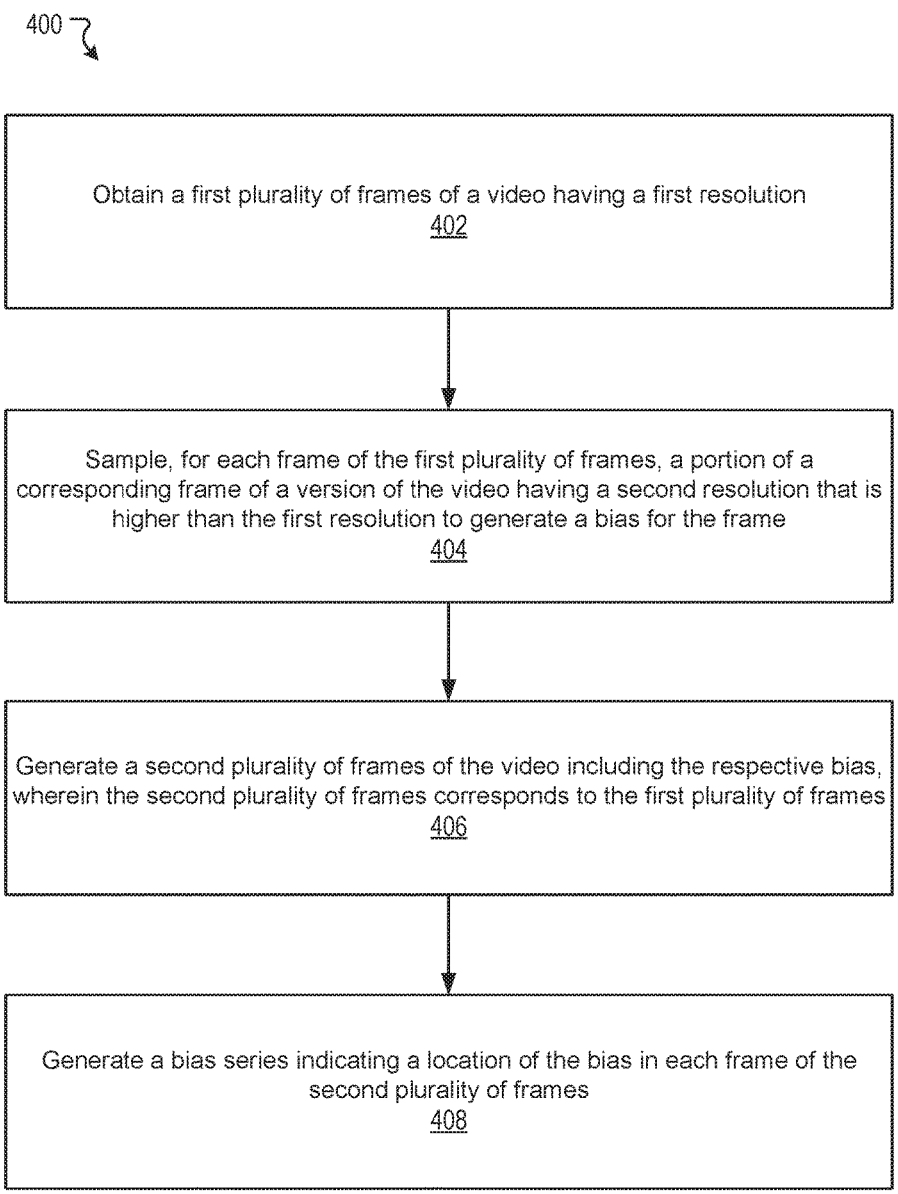
FIG. 4 illustrates an example first method for encoding video data including a bias, according to an embodiment of the present disclosure.

FIG. 4 illustrates an example first method 400 for encoding video data including a bias, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain a first plurality of frames of a video having a first resolution. At block 404, the example method 400 can sample, for each frame of the first plurality of frames, a portion of a corresponding frame of a version of the video having a second resolution that is higher than the first resolution to generate a bias for the frame. At block 406, the example method 400 can generate a second plurality of frames of the video including the respective bias, wherein the second plurality of frames corresponds to the first plurality of frames. At block 408, the example method 400 can generate a bias series indicating a location of the bias in each frame of the second plurality of frames. Other suitable techniques that incorporate various features and embodiments of the present disclosure are possible.

Figure 5:
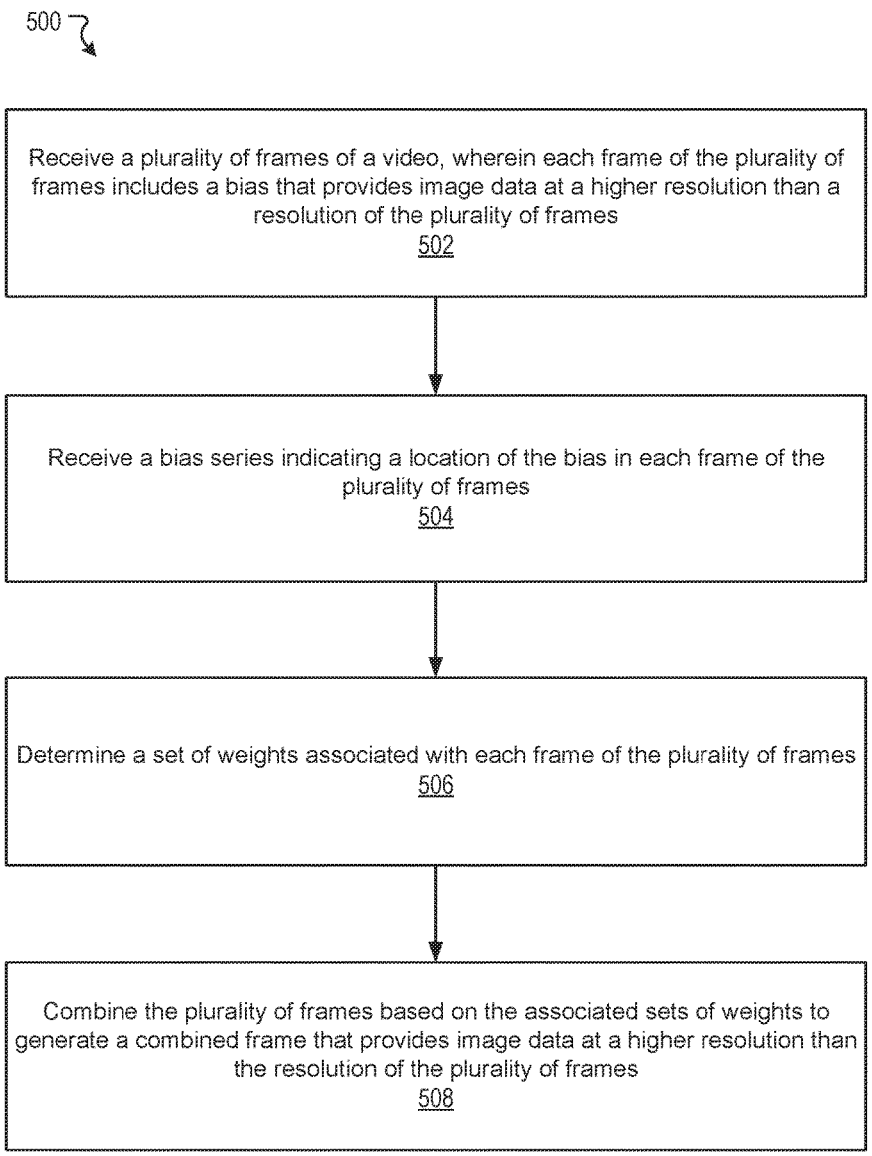
FIG. 5 illustrates an example second method for decoding video data including a bias, according to an embodiment of the present disclosure.

FIG. 5 illustrates an example second method 500 for decoding video data including a bias, according to an embodiment of the present disclosure. It should be understood that there can be additional, fewer, or alternative steps performed in similar or alternative orders, or in parallel, based on the various features and embodiments discussed herein unless otherwise stated.

At block 502, the example method 500 can receive a plurality of frames of a video, wherein each frame of the plurality of frames includes a bias that provides image data at a higher resolution than a resolution of the plurality of frames. At block 504, the example method 500 can receive a bias series indicating a location of the bias in each frame of the plurality of frames. At block 506, the example method 500 can determine a set of weights associated with each frame of the plurality of frames. At block 508, the example method 500 can combine the plurality of frames based on the associated sets of weights to generate a combined frame that provides image data at a higher resolution than the resolution of the plurality of frames. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
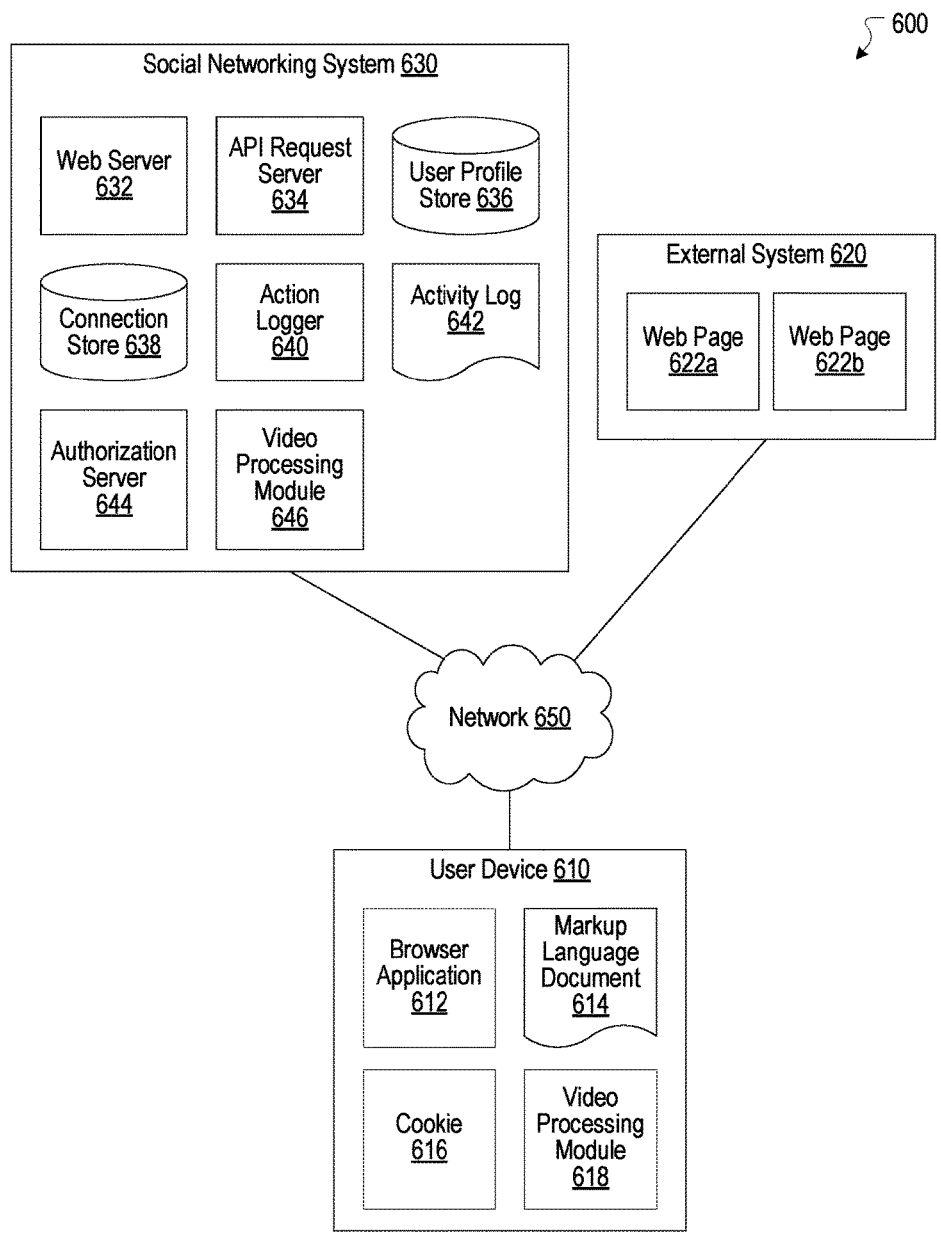
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a video processing module 646. The video processing module 646 can be implemented with the video processing module 102, as discussed in more detail herein. For example, the social networking system 630 can receive a high resolution video from a client computing device, such as the user device 610. The video processing module 646 can encode a low resolution video of the high resolution video. The video processing module 646 can send the encoded low resolution video to a client computing device, such as the user device 610. In some embodiments, the user device 610 can also include a video processing module 618. The video processing module 618 can be implemented with the video processing module 102, as discussed in more detail herein. For example, the user device 610 can receive an encoded low resolution video, and the video processing module 618 can decode the received low resolution video. In some embodiments, the video processing module 618 can encode a low resolution video of a high resolution video and send the encoded low resolution video to the social networking system 630, and the video processing module 646 can receive the encoded low resolution video and decode the received low resolution video.

Hardware Implementation

Figure 7:
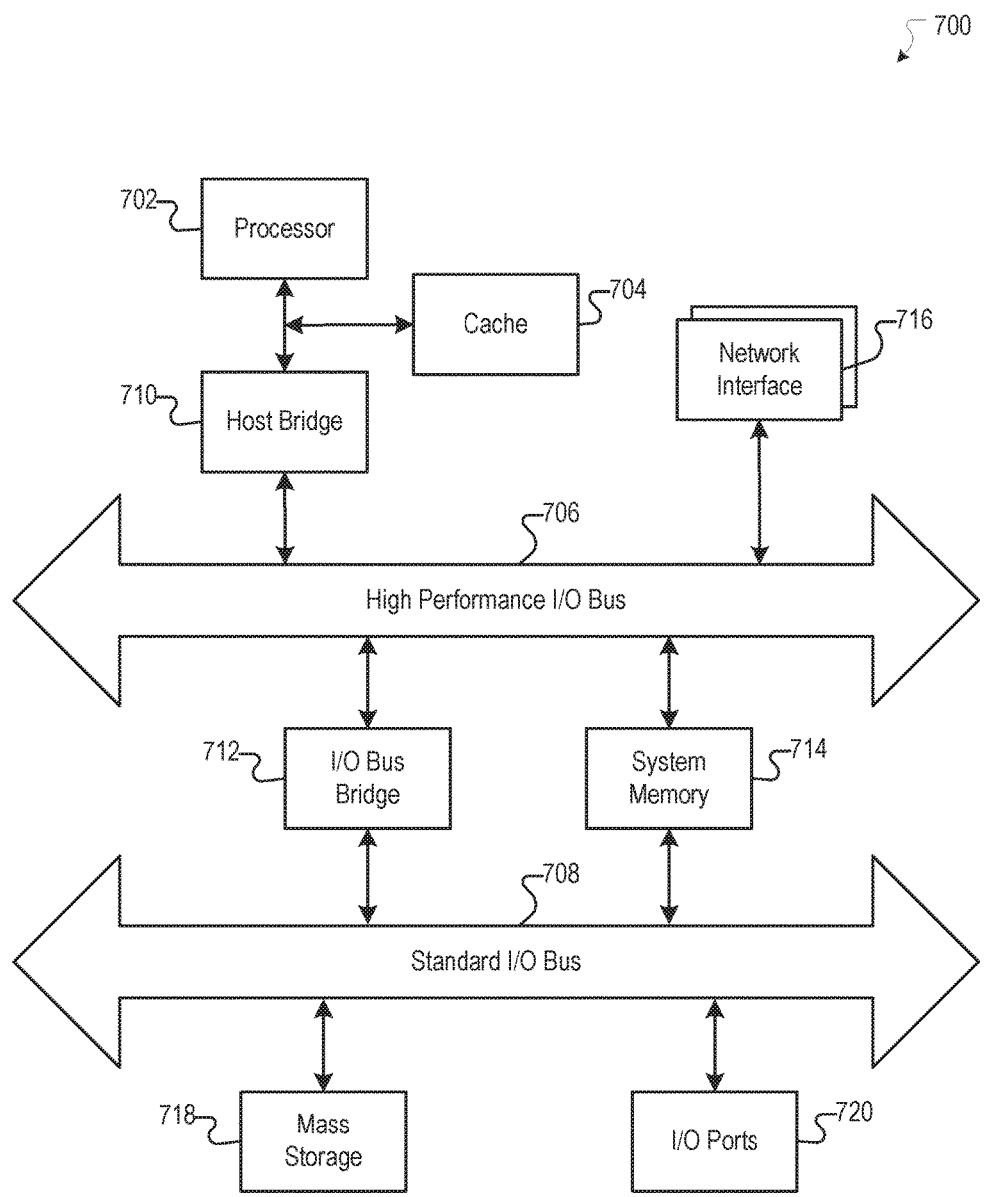
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
obtaining, by a computing system, a first plurality of frames of a video having a first resolution;
sampling, by the computing system, for each frame of the first plurality of frames, a portion of a corresponding frame of a version of the video having a second resolution that is higher than the first resolution to generate a bias for the frame;
generating, by the computing system, a second plurality of frames of the video including the respective bias, wherein the second plurality of frames corresponds to the first plurality of frames; and
generating, by the computing system, a bias series indicating a location of the bias in each frame of the second plurality of frames.

2. The computer-implemented method of claim 1, wherein each frame of the first plurality of frames and each frame of the second plurality of frames is an I-frame.

3. The computer-implemented method of claim 1, wherein the bias is selected from one or more of: a scanning bias, a pseudo random bias, a random bias, or a stippled bias.

4. The computer-implemented method of claim 3, wherein the bias is a pseudo random bias, wherein the bias series includes an initial value to be input into a pseudo random number generator, and wherein the location of the bias in each frame of the second plurality of frames is indicated by a corresponding number generated by the pseudo random number generator.

5. The computer-implemented method of claim 1, further comprising transmitting the second plurality of frames and the bias series to a decoder.

6. The computer-implemented method of claim 5, wherein a set of weights associated with each frame of the second plurality of frames is determined, and wherein the second plurality of frames is combined based on the associated sets of weights to generate a combined frame that provides image data at a higher resolution than the first resolution.

7. The computer-implemented method of claim 6, wherein one or more frames of the video are reconstructed by the decoder based on the combined frame.

8. The computer-implemented method of claim 6, wherein the set of weights associated with each frame of the second plurality of frames includes a weight for each pixel of the frame.

9. The computer-implemented method of claim 8, wherein a pixel including the bias in a frame of the second plurality of frames is assigned a higher weight than a pixel not including the bias in the frame.

10. The computer-implemented method of claim 6, wherein the second plurality of frames depicts the same scene or scenes having a similarity metric that satisfies that a threshold value.

11. A system comprising:
at least one hardware processor; and
a memory storing instructions that, when executed by the at least one processor, cause the system to perform:

obtaining a first plurality of frames of a video having a first resolution;

sampling, for each frame of the first plurality of frames, a portion of a corresponding frame of a version of the video having a second resolution that is higher than the first resolution to generate a bias for the frame;

generating a second plurality of frames of the video including the respective bias, wherein the second plurality of frames corresponds to the first plurality of frames; and generating a bias series indicating a location of the bias in each frame of the second plurality of frames.

12. The system of claim 11, wherein the instructions further cause the system to perform transmitting the second plurality of frames and the bias series to a decoder.

13. The system of claim 12, wherein a set of weights associated with each frame of the second plurality of frames is determined, and wherein the second plurality of frames is combined based on the associated sets of weights to generate a combined frame that provides image data at a higher resolution than the first resolution.

14. The system of claim 13, wherein one or more frames of the video are reconstructed by the decoder based on the combined frame.

15. The system of claim 13, wherein the set of weights associated with each frame of the second plurality of frames includes a weight for each pixel of the frame.

16. A non-transitory computer readable medium including instructions that, when executed by at least one hardware processor of a computing system, cause the computing system to perform a method comprising:

obtaining a first plurality of frames of a video having a first resolution;

sampling, for each frame of the first plurality of frames, a portion of a corresponding frame of a version of the video having a second resolution that is higher than the first resolution to generate a bias for the frame;

generating a second plurality of frames of the video including the respective bias, wherein the second plurality of frames corresponds to the first plurality of frames; and generating a bias series indicating a location of the bias in each frame of the second plurality of frames.

17. The non-transitory computer readable medium of claim 16, wherein the method further comprises transmitting the second plurality of frames and the bias series to a decoder.

18. The non-transitory computer readable medium of claim 17, wherein a set of weights associated with each frame of the second plurality of frames is determined, and wherein the second plurality of frames is combined based on the associated sets of weights to generate a combined frame that provides image data at a higher resolution than the first resolution.

19. The non-transitory computer readable medium of claim 18, wherein one or more frames of the video are reconstructed by the decoder based on the combined frame.

20. The non-transitory computer readable medium of claim 18, wherein the set of weights associated with each frame of the second plurality of frames includes a weight for each pixel of the frame.

* * * * *